(12) United States Patent
Niemeier

(10) Patent No.: US 6,772,499 B2
(45) Date of Patent: Aug. 10, 2004

(54) METHOD OF PRODUCING A METAL SECTION

(75) Inventor: Ralf Niemeier, Herzebrock-Clarholz (DE)

(73) Assignee: Attlington Investments Limited (GI)

( * ) Notice: Subject to any disclaimer, the term of this patent is extended or adjusted under 35 U.S.C. 154(b) by 0 days.

(21) Appl. No.: 09/097,295

(22) Filed: Jun. 12, 1998

(65) Prior Publication Data

US 2002/0116809 A1 Aug. 29, 2002

Related U.S. Application Data

(63) Continuation of application No. PCT/EP96/05387, filed on Dec. 4, 1996.

(30) Foreign Application Priority Data

Dec. 14, 1995 (DE) .......................................... 195 46 660
Jun. 7, 1996 (DE) .......................................... 196 22 760

(51) Int. Cl.$^7$ .............................................. B23P 11/00
(52) U.S. Cl. .......................... 29/515; 29/521; 403/274; 403/285
(58) Field of Search .......................... 29/515, 514, 458, 29/469.5, 521, 557; 403/274, 282, 285; 72/365.2, 366.2

(56) References Cited

U.S. PATENT DOCUMENTS

| | | | | |
|---|---|---|---|---|
| 930,413 A | * | 8/1909 | Parsons et al. ................ | 29/515 |
| 1,498,892 A | * | 6/1924 | Steenstrup .................... | 29/514 |
| 2,193,231 A | * | 3/1940 | Gibbons ..................... | 72/365.2 |
| 2,241,952 A | * | 5/1941 | Lachman ..................... | 29/515 |
| 3,113,083 A | * | 12/1963 | Silvester ..................... | 29/514 |
| 3,131,471 A | * | 5/1964 | Nieter ........................ | 403/285 |
| 3,392,566 A | * | 7/1968 | Sporck ....................... | 72/366.2 |
| 3,553,831 A | * | 1/1971 | Palmer et al. ................ | 29/514 |
| 4,067,585 A | * | 1/1978 | Rode .......................... | 277/379 |
| 4,133,091 A | * | 1/1979 | Ito ............................. | 29/514 |
| 4,614,550 A | * | 9/1986 | Leonard et al. ............. | 148/677 |
| 4,846,971 A | * | 7/1989 | Lamort ....................... | 29/515 |
| 4,984,673 A | * | 1/1991 | Saito et al. .................. | 72/187 |
| 5,121,537 A | * | 6/1992 | Matsui et al. ................. | 29/514 |
| 5,666,841 A | * | 9/1997 | Seeger et al. ................. | 72/110 |

FOREIGN PATENT DOCUMENTS

DE  40 07 161 A1  9/1991
EP  0101097 A1 *  2/1984

* cited by examiner

*Primary Examiner*—David P. Bryant
*Assistant Examiner*—Jermie E. Cozart
(74) *Attorney, Agent, or Firm*—Katten Muchin Zavis Rosenman

(57) ABSTRACT

A method of producing metal sections wherein first a groove is made in a section limb by microstructure-changing deformation, then another section limb is placed in the groove and that material of the first section limb which is situated to the side of the groove is moved onto the side walls of the inserted section limb by pressure to such an extent that an at least force-fitting joint between the two section limbs is made at the contact location. This method of microstructure-changing attachment of section limbs makes it possible to produce metal sections with virtually any desired geometry and using any desired starting materials the strength of which sections is comparable to metal sections produced in a previously known manner.

23 Claims, 4 Drawing Sheets

METHOD OF PRODUCING A METAL SECTION

Figure 1:
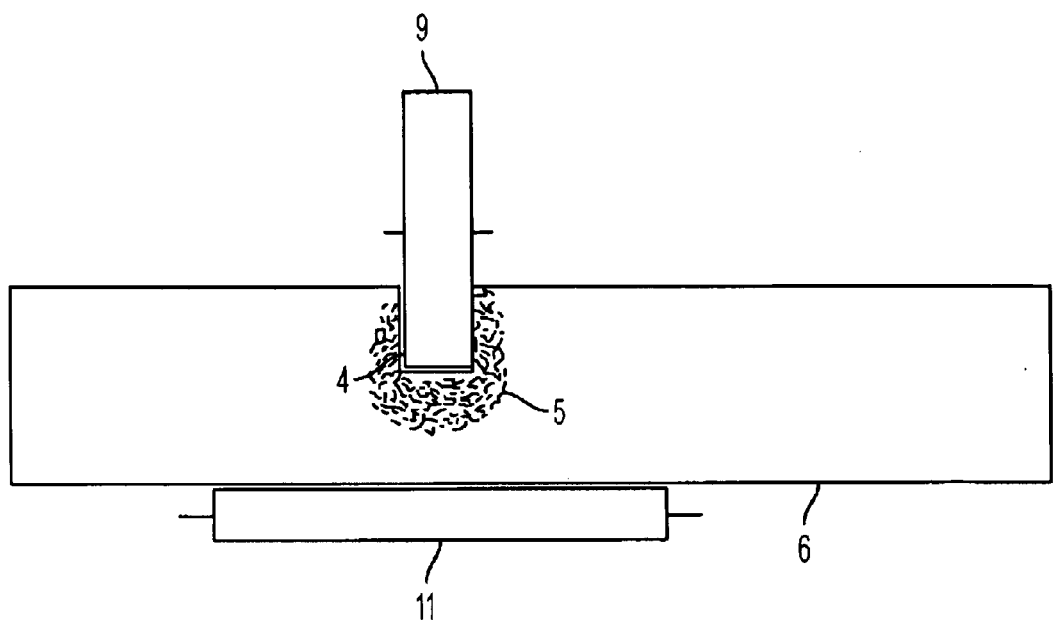

This application is a Continuation of PCT Application No. PCT/EP96/05387 filed Dec. 4, 1996 and which named the U.S. as a designated country.

The invention relates to a method of producing a metal section as used, for example, in the construction industry, in window construction, in the construction of vehicles or machines or similar application areas.

The known metal sections are generally produced from a piece of metal by rolling processes. A drawback of the known metal sections is that of having the same material thickness on all limbs of the profile, even though the loading requirements frequently only require a high level of stability in one axis, for example, as a resistance to bending. The material present in the axis which is subject to a lower degree of loading is unnecessary and leads to material being wasted and higher costs. In addition, in conventional rolled sections the limbs in, for example, the y-axis cannot be arranged in any desired manner, since it is still necessary for it to be possible to roll the subsequent section, as a result of which the limb in the y-axis cannot be arranged in the vicinity of the static optimum, i.e. approximately in the centre of a section.

Moreover, the production method may lead to the material being weakened by buckling or bending of the material. Moreover, desired metal sections are frequently impossible to produce owing to the fact that metals can only be rolled up to certain material thicknesses. In addition, it is not possible to produce metal sections corresponding to the individual required use with interrupted section limbs or with section limbs arranged longitudinally, transversely, diagonally, in curves or in some other manner. Even extruded sections, as are illustrated, for example, in a production method shown in the Document DE 30 25 706, are generally only produced from relatively expensive material, such as for example aluminium, and in addition, owing to the complicated manufacturing processes, are expensive and sometimes have to be sized again. Such pre-sized metal sections are unable to eliminate the above-mentioned drawbacks in the production process. The known casting processes for metal sections are also expensive. A production method for sections made of castings is illustrated, for example, in the Document DE 448 116. In this method it is only possible to process section limbs which are produced on the rolling mill trains in the foundry from still glowing material. The method shown is still dependent on expensive tools in the foundry and is unsuitable for subsequent cold working or for metal sections with relatively intricate contours. In areas such as, for example, window construction, a multiplicity of different metal sections have to be processed in quick succession in accordance with the requirements on load-bearing capacity. In order to be able to cover the materials requirement, expensive storage and logistics are required. The processor is dependent on the correct sections being supplied at the correct time. In addition to the strength of limbs of a metal section in one axis, the requirements placed on individual section limbs may, however, also differ from one another in other ways, such as for example by sound and/or heat insulation, electrical conductivity, decorative coating, corrosion protection, defined buckling or crash behaviour in automotive construction or certain advantageous contours in terms of shaping and design integration, which requirements, however, owing to the technical features of currently known metal sections, can only be achieved by expensive re-machining of the finished sections or cannot be achieved at all. Also, combining section limbs made of different materials with one another, and specifically not only metallic materials, such as iron, copper, aluminium, alloys, etc., but also other materials, such as for example ceramic, glass, plastics, wood, etc., is currently possible only using expensively preformed parts and/or section limbs which can be joined with considerable assembly outlay such as by screwing, welding, adhesive bonding, etc.

In order to overcome the above-described drawbacks which result from the prior art, the object of the present invention is to provide a cost-effective method of producing metal sections which as a priority permits high throughputs, low tool wear and reliable joining of the section limbs while making the production method and the sections which can be produced thereby as variable as possible.

The object according to the invention is achieved by means of a production method in which firstly a groove is made in another section limb by means of a microstructure-changing material deformation, then the abutting side of a section limb of the metal section is positioned in the groove situated on the inside of the other section limb and then, by means of a pressure at which the flow limit of the material situated beneath the said groove is exceeded, the material, situated next to the groove, of the other section limb is directly or indirectly caused to move towards the side faces of the one section limb to such an extent that at least a force-fitting join is achieved at the contact locations. If a groove is of wide enough design, it is also possible according to the invention to attach more than one section limb in a groove in a microstructure-changing manner.

In a further refinement of the invention, the groove is made and/or the material, situated next to the groove, of the other section limb is subsequently pressed onto the side faces of the one section limb by means of suitably shaped pressure rolls, along which the section limbs, which are placed one inside the other, pass and/or beyond which the section limbs move. However, it is also possible for the groove to be made and/or the material, situated next to the groove, of the other section limb to be pressed on by means of the stroke movement of a suitable and suitably shaped tool. The profile limbs may comprise any desired flat material or semifinished products. The channel depth and/or width of the groove may be smaller at one point of a cross-section than at another point, so that one or more protruding teeth are formed, the front edges of which press into the material of the one section limb during the microstructure-changing attachment or, in the event of a corresponding positive/negative shaping of the parts to be attached to one another, mesh with one another. Such a design of the groove may, for example, be achieved by means of a plurality of correspondingly angled and shaped pressure rolls or by bending up the other section limb prior to the microstructure-changing introduction of the groove and then bending it back.

Moreover, it is possible for the groove situated in the other section limb and the material, penetrating into the groove, of the one section limb to be at an angle to the vertical axis of the one section limb or for the vertical centre axis of the groove not to be at right angles to the horizontal surface of the other section limb, in order to achieve a greater contact area between the materials to be joined or to optimize the introduction of forces in the desired manner.

In addition to the introduction of the groove, it is possible for suitably shaped and aranged tools to machine at least one of the side walls of the groove in such a manner that the frictional resistance is increased in a manner known per se, such as for example by notches, perforations, roughening, graining, which effect can be achieved by rolls or else by stroke-executing tools. It is also possible, for example, in the same way to compress the underside of the penetrating section limb at least on one side and/or in an at least partially widening manner, or to effect other measures which increase the frictional resistance, such as notches in the longitudinal and/or transverse directions, perforations, graining, stamping, roughening and/or making projections in the section limb to be placed in the groove. However, machining which increases the frictional resistance may also be carried out by other means which are known per se, such as for example tools of other than rolls, for instance single-point tools, press tools, etc., or chemical processes such as etching. The proposed treatment of the groove and/or of the side faces can be carried out variably in differing thicknesses at differing intervals, intermittently, alternately or in some other manner. The machining which increases the frictional resistance may be carried out in a manner in which not only are the sliding forces between the surfaces resting on one another increased, but also, in addition to the force fit, a form fit is achieved between the surfaces resting on one another. Instead of, or as well as, the treatment which increases the frictional resistance, the section limb to be inserted may be microstructurally changed or upset in the region of the insertion depth or even above this, in order to create a form-fitting join or desired defined force ratios following the microstructure-changing attachment to one or more other section limbs.

During the microstructure-changing impressing of the groove and during the subsequent pressing onto the side faces, the section limbs are supported by retainers. In the case of stroke-executing tools, the support may be provided by simple plates as retainers, while in the case of conveying systems with an advance over rolls, the support also has to be effected by mobile retainers, preferably by rolls. In the case of smooth section limbs, the supporting surfaces of the retainers should likewise be of smooth design, unless it is desired to achieve an additional shaping of a section limb over and above the introduction of the groove or the pressing-on of the adjacent material. A profile limb machined by pressure rolls may then, for example, be supported on the other (rear) side by negatively shaped pressure rolls, which permits an additional shaping process to the microstructure-changing deformation for the purpose of attaching the machined section limbs. Thus it is possible to incorporate projections, bulges, beads, etc., into a section limb. Before, during or after the microstructure-changing attachment, it is possible for one or more section limbs of the metal section to receive machining and/or coatings which increase the stiffness, provide insulation, inhibit corrosion, reduce the weight, create desired breaking points or provide decoration. One or more section limbs may also, on one or alternate sides, be indented by shearing or provided with beads, in order, for example, to increase the torsional stiffness. An insulating coating of one or more section limbs may be realized using suitable materials, in order to achieve a desired mechanical, thermal, acoustic or electrical characteristic of the metal section. To prevent corrosion, it is possible for the profile limbs to have been or be completely or partially galvanized, lacquered or treated or coated in some other manner. In a further refinement of the invention, the corresponding machining and/or coatings are performed before or during passage through the microstructure-changing attachment. The appropriate tools may be accommodated in exchangeable magazines which permit rapid tool change and therefore high flexibility. However, should machining or coating during passage through the installation for microstructure-changing attachment be impossible or uneconomical, for whatever reason, these operations can also be performed subsequently. The production method according to the invention has the advantage that coatings suffer only relatively little damage during the microstructure-changing attachment. Suitable decorative coatings are, for example, a plastic coating, laquering, chrome-plating or gold-plating.

In a further refinement of the invention, the pressure rolls press the material, situated next to the groove, of the other section limb upwards at the side faces of the one section limb, in order to provide a larger contact and support area. Furthermore, it is proposed to sever one or more metal strips, which are further processed to form a section limb of a metal section, from a sheet-metal coil by means of pressure-exerting or cutting tools. The pressure-exerting or cutting tools may in this case themselves or using additional pressure-exerting or cutting tools, by means of a suitable design of the machining surface, additionally create notches and/or machining which increases the frictional resistance in the surfaces of the section limbs which are to be severed. In order to permit high processing rates, tools designed as rolls are proposed.

It is also possible to employ stamping tools which operate with a stroke movement instead of, or as well as, rolling tools, which permit a rolling production method, for the method steps according to the invention. Stamping tools are advantageous if machining is not required over the entire length of a section or if it is intended to operate with less expensive tools and/or at lower machining rates. In principle, in terms of the production of a microstructure-changing attachment according to the invention, there is no difference between tools operating by rolling and tools operating by stamping strokes. In order to increase the holding forces of the microstructure-changed join, but also in order to increase acceptance of the novel attachment technique or to fulfil statutory approval conditions or in order to be able to achieve other industrial advantages, it is possible additionally to reinforce the join by joining techniques which are known per se, such as for example adhesive bonding, riveting, welding.

It is possible for further, third material, for example in the form of wire, pieces of sheet metal, adapter pieces for filling excessively wide grooves or insulating material, to be introduced into the groove and applied to at least one side face of the one section limb, by means of microstructure-changing attachment, instead of, or as well as, the adjacent material of the other section limb. Such a procedure is conceivable, for example, if insufficient material is available for the microstructure-changing attachment owing to the depth of the groove being too small, if it is desired to make a particularly large slope, or if it is intended to introduce different, for example, harder material. It is also possible for suitably shaped third material, for example in the form of a wedge, to have a positive effect on the form fit of a microstructure-changing attachment.

The microstructure-changing attachment work-hardens the material which it affects. The material of at least one section limb attached in a microstructure-changing manner may, however, also be additionally work-hardened or hardened in some other manner subsequently. The section limbs attached in a microstructure-changing manner may be fully or partially coated before or after the attachment operation. The sections attached in a microstructure-changing manner may be canted previously or subsequently in any desired way and/or be deformed in any desired manner. The microstructure-changing attachment of the two or more section limbs to one another may be performed continuously but also in an interrupted manner on only one or more portions of the metal section, in teeth, curves, laterally offset, alternatingly or in any other desired manner. The groove may be formed continuously, but it is not necessary for a section limb to be placed continuously in the groove or for the adjacent material to be pressed on continuously. The material may be divided into short partial pieces or, depending on the individual pieces, may change as working material.

Moreover, the proposed method can be used to attach to a metal section further parts made of metal, glass, rubber, plastic, ceramic or other materials as section limbs or some other part to at least one of the section limbs in a microstructure-changing manner for decoration, sealing or for some other purpose and/or to join together two or more profile limbs, for example as a spacer or insulating web. As a result it is possible, for example, to arrange on the metal section acoustic, electrical, thermal or other insulations, housings, claddings, instruments or means for joining to other sections, covers or other shaped articles without additional attachment means, such as screws, rivets, etc.

At least in portions, the one section limb does not necessarily have to be attached to the other section limb, using the microstructural change, in a straight line but may also be attached thereto in a laterally offset line, such as for example in wave form, diagonally, transversely and/or in an interrupted manner. In combination with deformations and bevels which are possible before or afterwards, in theory it is possible by means of the method according to the invention to achieve all conceivable shapes and cross-sections of the section. Individual profile limbs can be pre-cut, stamped, laser-cut in a curved contour or may be pre-contoured in some other manner before they are attached to another section limb in a microstructure-changing manner, in order to produce a semi-circular arc or a rounded section. The section limbs may also, on one side along the longitudinal axis, be stamped, drawn, compressed, and/or rolled on the other side, in order to achieve bending of a section limb. Bimetallic limbs may also be used to achieve a desired thermal performance or the profile limbs are assembled at different temperatures, in order at a then identical temperature to achieve a specific material stress. For certain applications, such as for example girders in building or facade construction, the profiles have to exhibit a specific preloading, in order, under load in the installed condition, to correspond to a straight line. Such preloadings may be introduced into the section according to the invention in the manner described. It is thus possible to form, in any desired sequence, every conceivable shape of section using the operations described—including sheet-metal machining in progressive tools to achieve a desired shape of a section limb, such as for example in automobile construction.

The strength of the microstructure-changing attachment can be additionally increased if the one section limb placed in the groove is cooler than the other section limb before the two section limbs are atached to one another in a microstructure-changing manner. The other section limb is heated when a groove is made therein. If a cooler one section limb is placed in this groove, the two limbs are fastened to one another in a microstructure-changing manner and the other section limb is then cooled, the material of the latter then contracts, as a result of which the clamping action of the microstructure-changing attachment is assisted in a positive manner. This effect can be reinforced or replaced by a controlled heating or cooling of entire section limbs or parts thereof. If the groove is made as an undercut, the result is clamping lugs which protrude at the side walls of the groove, as a result of which a form-fitting join can be achieved in addition to the force-fitting join during the subsequent microstructure-changing pressing on. The form-fitting join can be additionally or only supported by shaping the section limb to be placed in the groove. An additional form-fitting join provides the advantage that it continues to exert holding forces if the holding forces provided by the force-fitting join should wear off for reasons of chemical, thermal, mechanical or some other action.

As an additional or alternative means for the microstructure-changing attachment, the materials to be joined together in the region of the groove can be joined together using a ram-striking process operating at high frequency. In the process, the material at the joining location is driven apart, deformed, and possibly almost welded together by the high-frequency movement. A groove which widens as its depth increases, in which groove the material can diverge and as a result is particularly well secured in a form-fitting manner against being subsequently detached from the join, has proven particularly advantageous here. The object of the high-frequency ram-striking process is for the materials of the section limbs to be attached to one another to become intermingled or interlayered as far as possible. A high-frequency treatment of a section limb or of the entire section may also advantageously be used to reduce inherent stresses or to produce a stabilized inherent stress.

The method according to the invention makes it possible to produce large quantities of the novel metal section quickly and cost-effectively at low tool costs, it being possible for the section limbs to be arranged virtually as desired with respect to one another and also for material of different thicknesses, even bar or block material, to be processed into a metal section. It is thus possible to adapt the metal section to the prevailing loads, leading to a reduction in costs and a weight saving. In the production method proposed, the tools used are not subject to a high level of wear. The individual section limbs are continuously reliably assembled by the machine tool in a manner resistant to shearing, top tension, compression and tension. The method proposed makes it possible to produce exact lengths for a specific requirement as easily as with commercially available bar stock cut to length. The machining installations themselves are so reasonable that even relatively small companies can purchase them and are thus able to produce an unlimited number of their own desired sections from a few widths and thicknesses of strip steel which they can keep in stock or can easily produce themselves. In the method according to the invention for producing a metal section, the junctions are not weakened by bending and cracking forces but, by contrast, are strengthened by the cold work-hardening which is to be achieved during the microstructure-changing attachment, so that there is more likelihood of the remaining section limb material bending under load than of the join becoming detached. In addition, in the event of very high static demands, subsequent controlled partial or complete increase of the material strength of the respective joining zones is possible, such as for example by shot-peening, heat treatment, etc. The corners may be of virtually angular design without rounded portions or material shoulders, as a result of which a smooth joint contour can be produced right up to the abutting edges of the individual section limbs. The zone in which two section limbs are attached to one another in a microstructure-changing manner extends, even if it is intended to achieve high extraction forces, to zones which are of only small width, for example to 1 mm or even a smaller width in the case of metal sheets which are a few millimetres thick, so that there are no optical and technical drawbacks resulting from projections or protrusions at the attachment location. Also, the section limbs being machined in the method according to the invention may optionally be subjected to different additional machining and/or treatments before, during or after the machining, depending on the time at which the machining or treatment can be caried out most easily. The production method may also be used to add additional variants to existing ranges of sections, girders, pipes, corners, etc., by the microstructure-changing attachment of additional section limbs or workpieces. Different materials in a finished metal section result in advantages for subsequent recycling, since the individual section limbs can later be separated from one another again relatively easily. This may be advantageous if toxic materials such as lead are used or individual limbs are contaminated in a particular manner by radioactive radiation, chemicals, etc., or individual section limbs consist of particularly valuable materials such as, for example, platinum in catalysts.

Figure 2:
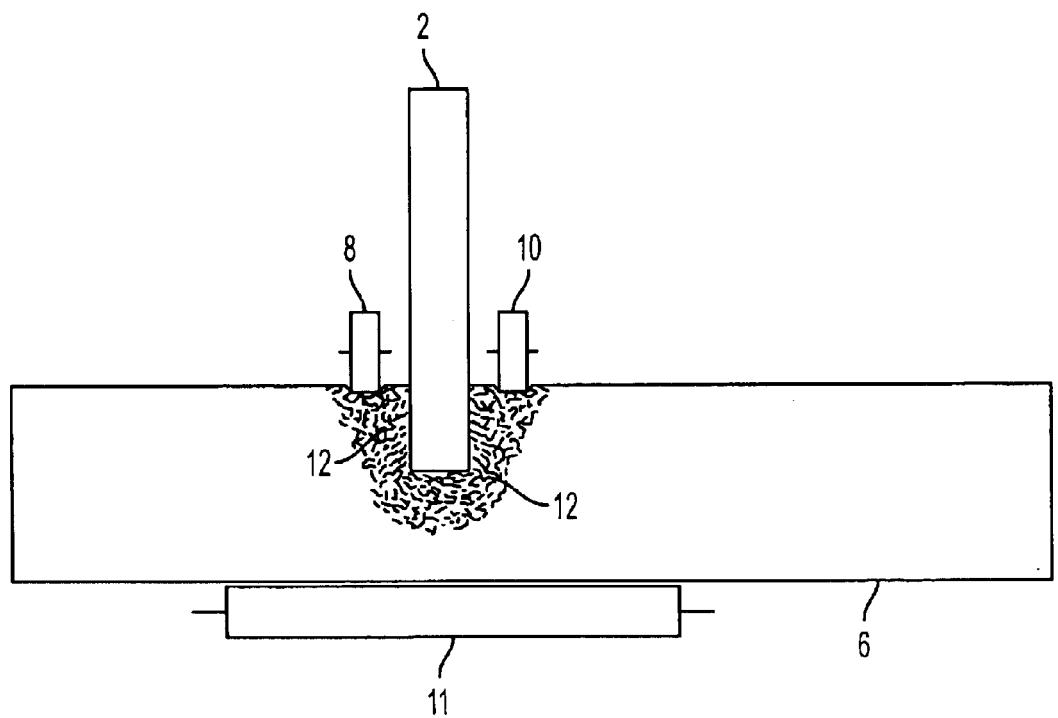
Figure 2A:
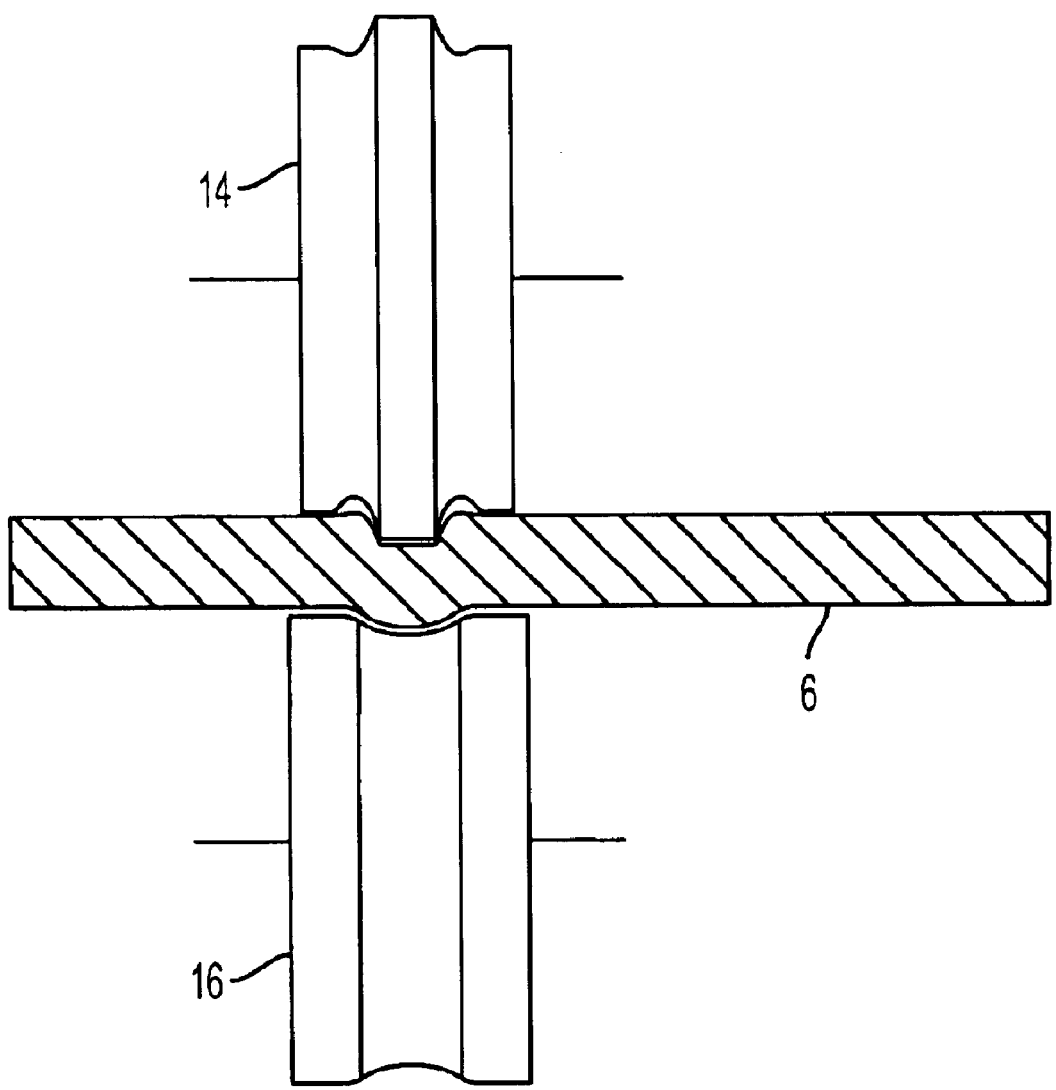
Figure 3:
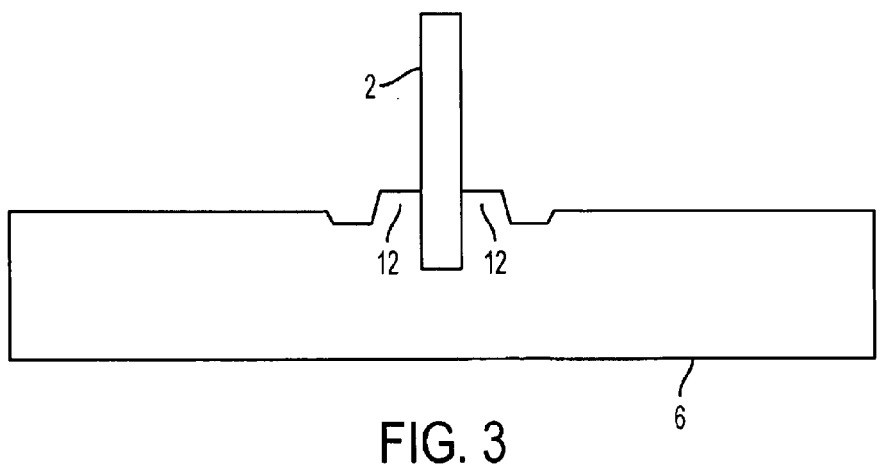
Figure 4:
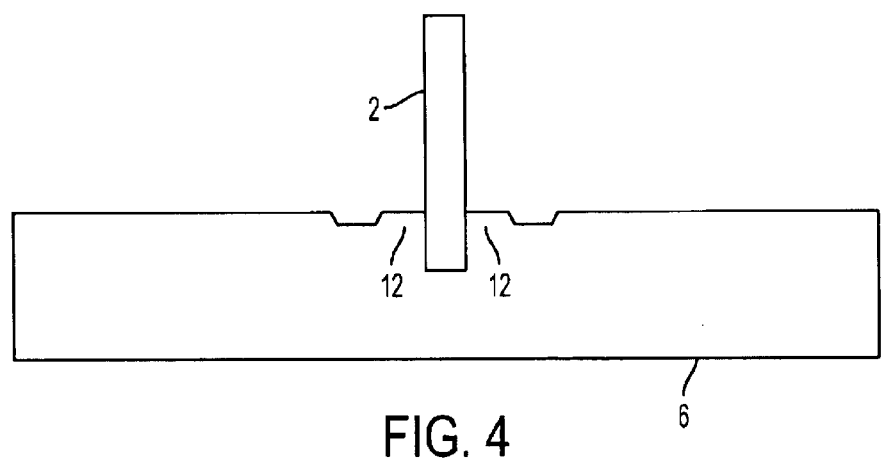
Figure 5:
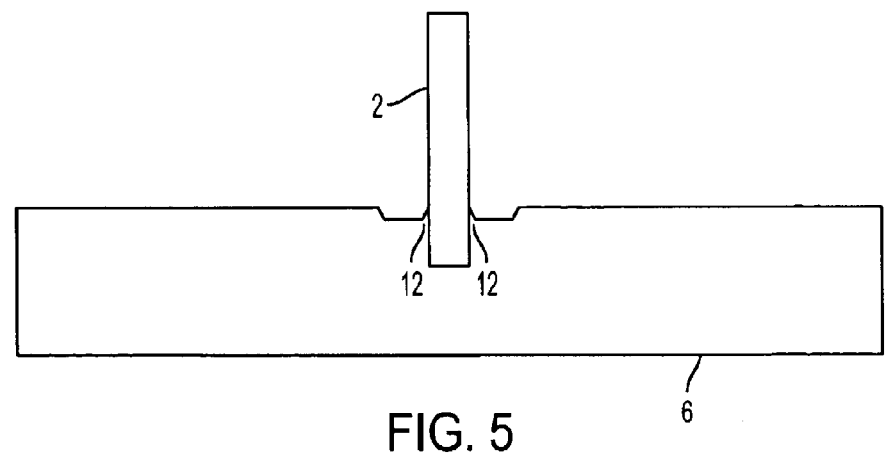
Figure 6:
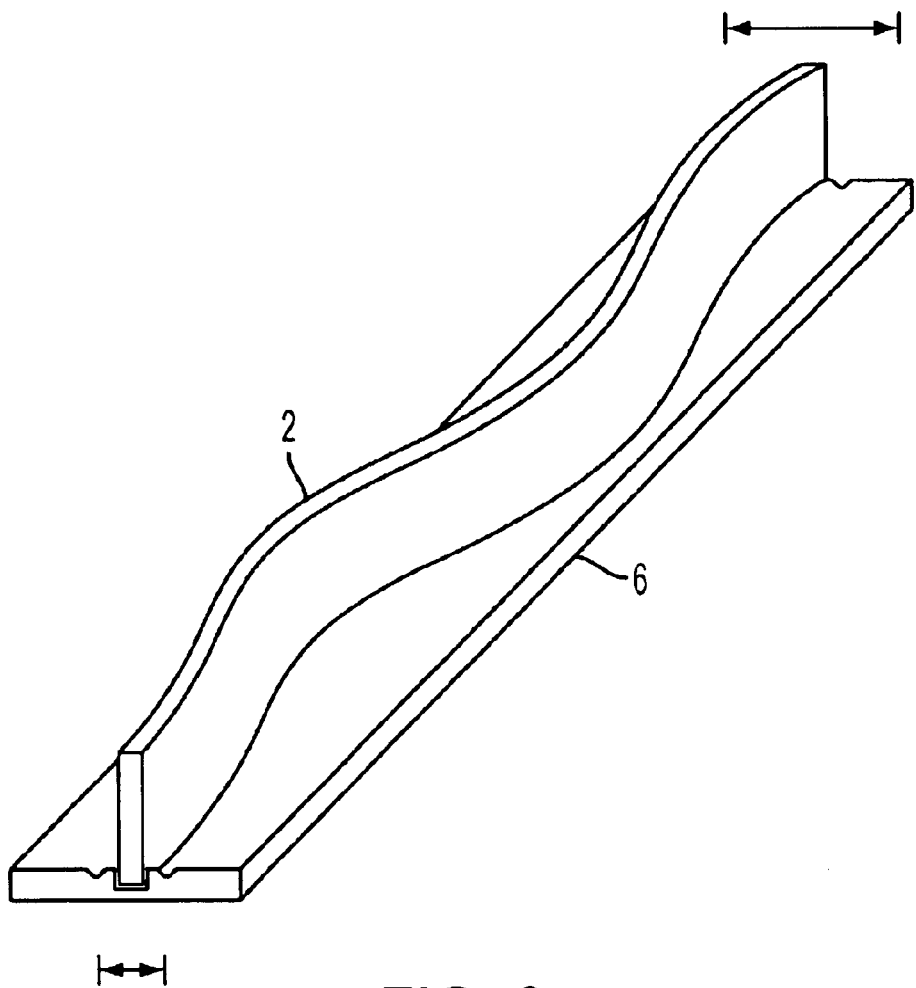

The method according to the invention for producing a metal section is explained in detail below with reference to an exemplary embodiment explained in the drawings, in which:

FIG. 1 shows a cross-section of a rolling operation for the microstructure-changing introduction of a groove into the material of the section limb by means of a roll, FIG. 2 shows a cross-section of a rolling operation for pressing the material, situated adjacent to the groove, of the section limb in the x-axis onto the lateral surfaces of the section limb in the y-axis, FIG. 2a shows a rolling operation for the microstructure-changing rolling of a groove into a section limb in the x-axis using rolls, the outer contour of which differs from the rolls shown in FIG. 1, FIG. 3 shows a cross-section through a finished metal section with adjacent material pushed upwards at the sides of the section limb, FIG. 4 shows a cross-section through a finished metal section with traces of the press-on tools situated further away from the inserted section limb, FIG. 5 shows a cross-section through a finished metal section with traces of the press-on tools situated very close to the inserted section limb, and FIG. 6 shows a metal section which has been cut open longitudinally and has a section limb arranged in a wave-like manner in the y-axis.

FIG. 1 shows a cross-section through a microstructure-changing rolling operation for making a groove in a section limb by rolling. The section limb 6 may be any desired semifinished product which does not in any way have to be pre-sized and also does not have to satisfy particular demands on dimensional accuracy and/or tolerances in order to be suitable for the production method according to the invention. Bent sheets, pre-formed sections or other semifinished products may also be employed instead of a flat material. The only precondition imposed on the material is that it have sufficient residual capacity for dimensional change for the following machining. The metal semifinished products which are used as a section limb for the attachment process described below have a crystalline microstructure with a lattice of grains.

Then, a groove 4 is made in the other section limb 6 in the cold state by cavity sinking or rolling into the surface by means of one or more suitable tools, such as the pressure roll 9 shown, in such a manner as to deform the structure of the material. The pressure exerted by the pressure roll 9 is, in this process, supported by the retainer roll 11, so that the section limb 6 cannot deviate under the pressure of the pressure roll 9. The material deformation for making the groove is a more or less minor change to the geometry (not shown in more detail in the figure) of the section limb 6 without loss of material or change of mass above the flow limit of the material. Unlike milling, cutting or other abrasive processes, it is intended here for the material present to remain available as far as possible. The micro-structure changes in the region of the deformation zone, as indicated by the hatching 5, and depending on the degree of deformation the material is work-hardened in the deformation zone. Depending on the design of individual tools and the selected sequence of different tools, it is possible to produce extremely controlled material flows. It is thus possible, by means of a suitably selected sequence of the tools, to keep the deformation forces low, to avoid excessive stresses on the material, to create zones of different work-hardening or to achieve desired shaping, such as for example undercuts, bulging, etc. The tools which form the groove in a material-deforming manner may be sharp, rounded, cornered, stepped, asymmetrical, with any desired traverse, may fill part of the width or may be provided with a geometry which promotes the flow of material in some other manner. The tools can operate as stroke-executing or rolling tools, and they may be mobile in every vertical, longitudinal and transverse axis, have different diameters, be eccentrically mounted, be placed at identical or different angles or be arranged in some other manner, in order to permit the desired requirements placed on forming the groove 4. Blank holders can also be used for a controlled flow of material, in order to obtain or promote certain deformations. It is also possible to use blank holders or additional forming tools in order to ensure that predetermined dimensions or tolerances are maintained. Depending on requirements, it is possible for the dimensional accuracy to be ensured by corresponding tools only for certain portions of a metal section, thus reducing costs. It is essential for the method according to the invention that parts of the material be deformed; it is even possible here for the material bond to be at least partially interrupted without as a result affecting the essence of the method according to the invention.

In FIG. 2, the one section limb 2 is already positioned in the finished groove 4 of the other section limb 6. The groove 4 was made in the other section limb 6 in a microstructure-changing manner as described. In this process, the material affected by the microstructural change was work-hardened. The structure of the side wall material of the groove 4 is directed, for example, towards the base of the groove 4, and the structure lines which are visible in a cross-section through a finished section then run arcuately towards one another below the base of the groove 4. A similar pattern can be seen in the regions in which the pressure rolls 8 and 10 act on the material of the body, but the exact picture of the structure is dependent on the design and sequence of the individual machine tools and/or pressure-exerting tools. In principle, during the machining by the groove-making and pressure-exerting tools, the material of the section limb 6 is stretched to the sides of the tools penetrating the material and compressed below the tools. When making the groove 4 in the material of the body of the section limb 6 and subsequently pressing on the material 12, located adjacent to the groove 4, of the section limb 6 by means of the pressure rolls 8 and 10, cold deformation results in a cold work-hardening of the material. The pressure rolls 8 and 10 produce such a high pressure on the material 12, situated adjacent to the groove, of the section 6 that, in the immediate pressurized region of the pressure rolls 8, 10, the flow limit of the material is exceeded and the material is thus made to flow by the pressure. The flowing material passes the pressure on to the zones which exert the lowest counter-pressure, i.e. adjacent to the groove those regions which, owing to a certain degree of play with the side walls of the groove 4, are able to deviate in the direction of the side faces of the section limb 2 placed in the groove 4. It should be noted at this point that the material can very easily deviate in a direction other than the direction in which the pressure applied by the pressure rolls 8 and 10 is directed. In the example shown in FIG. 2, the pressure is introduced into the section limb 6 parallel to the section limb 2, but the flowing material deviates laterally in the direction of the groove 4. However, the flowing movement may also be additionally assisted by a suitable shaping of the pressure rolls 8 and 10. Due to the flow behaviour arising as a result of the pressure, the gap which was previously present between the side walls of the inserted section limb 2 and the side walls of the groove 4 closes. The flowing material is also able to displace non-flowing material, so that not only the flowing material itself, but also, non-flowing material which is situated between the side walls of the groove 4 and the pressure-exerting surfaces of the pressure rolls 8 and 10 can move towards the side walls of the inserted section limb 2. If a suitably high pressure is introduced, the displaced adjacent material 12 comes to bear against the lateral surfaces of the section limb 2. A force-fitting join is thus created between the material of the two section limbs 2 and 6.

If the mutually adjacent faces of the groove 4 and the surfaces of the inserted section limb 2 are not smooth, but rather are roughened in any desired manner, upset, grained, undercut or else shaped in some other manner, in such a manner that they are better able by means of their shape to resist compressive, tensile and flexural forces arising with respect to one another, an additional form fit is produced as well as the force fit, the negative shaping of a side wall of the groove 4 with respect to the positive shape of the inserted section limb 2 being at least partially achieved firstly by means of the flowing movement of the material which movement is produced by the pressure introduced.

Depending on the static demands on the finished metal section and the corresponding setting of the pressure rolls 8 and 10, the latter can penetrate to a greater or lesser depth into the material 12 situated adjacent to the groove, but without a cutting effect of excessive magnitude, which would tend to have an unfavourable effect on the strength of the microstructure-changing attachment.

The geometry of the edge of a pressure roll and thus the pressure introduced thereby can also be considered under this aspect. However, even a flat circumferential contour of the pressure roll makes it possible to achieve a satisfactory microstructure-changing attachment effect. The distance of the pressure rolls 8 and 10 from the lateral surfaces of the section limb 2 can also be selected in accordance with the demands on the finished metal section. Depending on the setting of the pressure rolls 8 and 10, it is possible to push upwards the material 12, situated adjacent to the groove, at the lateral surfaces of the section limb 2. The material is pushed upwards laterally against the surfaces of the section limb 2, in order to enlarge the contact area between the section limbs. A cross-section through an example of a correspondingly produced section is shown in FIG. 3. Pushing upwards in this way results in a larger contact area between the section limbs 2 and 6 and, consequently, a higher holding force. A higher slope can also be achieved by the insertion of additional, third material, for example in the form of a wedge or wire. It is also possible to vary the lateral distance of the pressure-exerting tools 8, 10 acting on the section limb 6 from the side faces of the section limb 2 placed in the groove 4. However, it should be ensured here that the flow movement of the material beneath the pressure-exerting tools remains sufficient to produce at least a force-fitting join between the adjacent material 12 and the side walls of the inserted section limb 2. Examples of finished metal sections which were produced with differing distances of the pressure-exerting tools 8,10 from the section limb 2 are shown in FIGS. 4 and 5. It is easy for the person skilled in the art to understand, without enclosing further figures to illustrate this, that it is also possible to vary the depth of the groove 4 and the penetration depth of the pressure-exerting tools 8,10 without as a result departing from the principle of producing an at least force-fitting join by microstructure-changing attachment. Depending on the setting of pressure rolls 8 and 10, it is therefore also possible to create a tension-resistant and compression-resistant join between the section limbs 2 and 6, which join enables the static properties of the metal section to be approximately comparable to conventional sections.

In order, in the automotive industry, to achieve a specific crash performance or a specific vibrational performance of a metal section according to the invention, it is possible, for example, to change the penetration depth of the pressure rolls or the lateral spacing during the passage of a section. A further possibility for affecting the statics of a finished metal section results from following machine tools which are able to smooth the channels and the slope angle in a controlled manner. The finished microstructure-changing attachment is secured against subsequently coming open at the contact locations in that the bottom of the material whose microstructure has been changed remains joined over its area to the remaining material situated beneath it of the section limb 6. Tensile, top tensile, compressive and flexural forces occurring can thus be dissipated over a wide area into the less compacted section limb material situated below, and micro-movements of the compacted material whose microstructure has been changed are thus prevented at the join locations. It is precisely here that the major advantage of the microstructure-changing attachment is found by comparison to the known, pre-sized bending limbs projecting above the surface of a section limb 6, into which bending limbs a section limb is placed: the bendable limbs projecting above the surface are fundamentally much more susceptible to undesired subsequent bending upwards, since they are exposed to higher leverage forces. By contrast, in the proposed method the lateral bearing faces of the groove 4 are embedded in the material of the section limb 6 and are consequently much better supported against leverage forces.

The method according to the invention can also be implemented or supplemented by pressure-exerting tools acting in a punctiform manner instead of by a rolling method using pressure rolls. Optionally provided additional pressure rolls are not shown but can be used to machine the side walls of a groove in such a manner as to increase the frictional resistance, for example by slotting, notching, knurling, perforating, etc., in order to increase the strength of the join between the section limbs 2 and 6. The method described can also be used without greater expenditure to assemble a plurality of section limbs in various axes. In this case, the respectively required pressure-exerting tools may be arranged above one another, one behind the other and/or next to one another, or additional section limbs can be attached to the partly finished metal section in a microstructure-changing manner by repeatedly passing the latter through a pressure roll train or through the stroke-performing tools.

It is also shown, diagrammatically in cross-section, in FIG. 2a how a groove is rolled into another section limb 6. The particular feature here is that the pressure roll 14 is suitably shaped on its circumferential surface to make the desired groove contour in a microstructure-changing manner in the other section limb 6 passing beneath the pressure roll, but also in addition to the groove 4 carries out a further shaping of the section limb 6. The pressure roll 16, the circumferential surface of which represents a negative shape with respect to the configuration of the circumferential surface of the pressure roll 14, is illustrated beneath the section limb 6. On the one hand, the pressure roll 16 supports the section limb against the pressure exerted by the pressure roll 14 and, on the other hand, it assists the desired shaping process by means of the negative shape of the circumferential surface.

In addition to pressure rolls having a purely supporting function, it is also possible to integrate cutting of pressure-exerting tools into the production process, which tools, by making grooves, cuts or holes, serve to avoid excessive deformation of the section limbs undergoing machining. It is known to the person skilled in the art from the machining of metal sheets how to carry out corresponding machining in order to achieve specific desired material movements.

As shown in FIG. 1, it is, of course, also possible for smooth pressure rolls to act instead of the shaping pressure rolls 14 and 16 on a moving metal sheet, even as far as the shaping necessary for forming the groove contour, or for cutting pressure rolls to sever metal section limb parts from a sheet-metal coil in an upstream or downstream machining process, if the pressure rolls 14 and optionally 16 are correspondingly shaped and arranged, and it is possible for a plurality of pressure rolls to be arranged one behind the other or individual section limbs pass through a machining line a number of times. By additionally shaping the circumferential surface of the pressure roll 14 and 16 or, if appropriate, by means of additional pressure rolls, it is possible to machine, notch or undercut the passing section limbs in such a manner as to additionally increase the frictional resistance. The material moved during the microstructure-changing pressing on can penetrate into the free spaces created by the machining and thus bring about an additional form-fitting intermeshing. However, the roll 16 as mating roll may also be of smooth design, like the mating rolls 11 illustrated in FIGS. 1 and 2, if it is not desired to shape the other section limb 6.

Preferably, the pressure rolls of the machine tools should be easily exchangeable, in order rapidly to be able to produce any desired sectional shape without high fitting costs. The pressure-exerting tools may operate on one or both sides of the groove. In the event of a pressure-exerting tool pressing only on to one side, it is advantageous if blank holders or retainers operate on the other side, in order to achieve a satisfactory result. Pressing on only on one side is recommended, for example, if it is intended for a section limb to be placed tight against the end edge of the surface of the other section limb, in order, for example, to produce a L-section and sufficient material is no longer present on the other side of the groove to be able to achieve a force-fitting bearing of the material against the surface of the inserted one section limb by exceeding the flow limit of the material.

FIG. 6 shows how the one section limb 2 is attached to the other section limb 6 in a wave-like manner. A supporting width, corresponding to the wave amplitudes, of the other section limb 6 is thus achieved on the one section limb 2 over the length of the finished metal section, over and above the actual material thickness of the section limb 2, as a result of which, the torsional stiffness of the finished metal section is increased. However, the torsional stiffness can also be increased by means of a plurality of section limbs in the direction of a bending axis or by means of widening or other deforming machining of a section limb. Such a groove of non-linear design can be achieved by deflecting the machine tools or by a special shaping of the machine tools.

The object of implementing a machining line which operates in accordance with the method according to the invention does not present any great difficulty to a person skilled in the art. Suitably cut sheet metal is introduced in an attachment machine operating in a structure-deforming manner. During the advance, individual pressure rolls take care of the formation of the groove. A section limb is placed in the finished groove and the two section limbs are attached to one another along the groove by suitably arranged pressure rolls by means of the microstructure-changing attachment method. Subsequent pressure rolls can smooth the attachment grooves and any burrs and slope angles. It is also possible to provide stamping tools which perform a stroke in the machine instead of the pressure rolls. The position of the pressure rolls should be adjustable and the pressure rolls themselves should be exchangeable, in order to be able to utilize fully the high flexibility of the novel method. It is possible by means of a suitable machine to achieve high conveying rates and throughputs, by means of which section material which fully meets demands can be produced from simple flat material. The machine can be equipped with automation devices in order to be able to supply the correct metal sections at the correct moment in the cycle in a manufacturing installation. Corresponding devices are known from the prior art in terms of control engineering. This production machine may be of modular design in construction terms, in order to be able to configure a suitable machine in accordance with the requirements, financial resources and willingness to invest of the purchaser.

I claim:

1. A method of producing a metal section, said method comprising the steps of:

making a groove in a first section limb by microstructure-changing material deformation, whereby the degree of deformation is chosen in such a way that the material at least in a deformation zone below the groove is at least partially work-hardened in comparison with remaining material of the first section limb, providing an insertion depth region of a second section limb that is adapted for insertion into said groove in said first section limb and then treating said insertion depth region of said second section limb by microstructure-changing material deformation to increase frictional resistance of said insertion depth region with said groove in said first section limb;

positioning said insertion depth region of said second section limb in the groove situated on an inside portion of the first section limb; and applying a pressure at which a flow limit of material situated on both sides of the groove is exceeded, further changing the microstructure of the material in the region near the groove and causing said material situated in said region near the groove of the first section limb to move toward at least one side of the second section limb to such an extent that at least a force fitting joint and a form fitting joint are achieved at substantially all contact locations, said force fitting joint being enhanced by the increased frictional resistance provided by the microstructure-changing material deformation of said insertion depth region of said second section limb section.

2. A method according to claim 1, including: making the groove and the material in said region near the groove of the first section limb press onto at least one side face of the insertion region of the second section limb by means of suitably shaped pressure rolls, along which the first and second section limbs, which are placed one inside the other, are displaced relative to the pressure rolls.

3. A method according to claim 1, including pressing together the groove and the material located adjacent to the groove by at least one stroke movement of suitable tools.

4. A method according to claim 1, including making any section limb from a semifinished product.

5. A method according to claim 1, including making the groove to have different dimensions at one point of a cross-section through the first section limb by comparison with another point of cross-section through the first section limb.

6. A method according to claim 1, including making the groove in the first section limb and material of the second section limb which penetrates into the groove at an angle which is not at a right angle to a surface of the first section limb.

7. A method according to claim 1, wherein said groove has side walls and including the step of machining at least one of the side walls of the groove by suitably shaped and arranged tools in such a manner that frictional resistance is increased during subsequent steps.

8. A method according to claim 1 including supporting any section limb by retainers.

9. A method according to claim 1 including providing the first or second section limb which is machined by passing said first or second section limb between a shaped pressure roll and a support structure having an interlocking configuration positioned to receive the shaped pressure roll in order to support a strip of sheet metal to be shaped.

10. A method according to claim 1 including providing at least one pressure roll;
   pushing the material in the region of the groove of the first section limb upwards against the second section limb with the pressure roll.

11. A method according to claim 1 including providing any section limb made from at least one metal strip severed from a sheet-metal coil.

12. A method according to claim 1, including providing any section limb to be configured to increase frictional resistance.

13. A method according to claim 1 including stamping the first section limb and the second section limb together.

14. A method according to claim 1 including bonding the first section limb to another section limb.

15. A method according to claim 1 including the step of: introducing a third material into the groove with the second section limb by means of a microstructure-changing attachment.

16. A method according to claim 1 including hardening at least one section limb after attachment.

17. A method according to claim 1 including coating any portion of any section limb.

18. A method according to claim 1 including attaching at least one additional part to any section limb.

19. A method according to claim 1 including canting or deforming any section limb.

20. A method according to claim 1 including attaching the first section limb to the second section limb in ways other than a central, straight line.

21. A method according to claim 1 including making the second section limb a different temperature from the first section limb before attachment.

22. A method according to claim 1 further including using a ram-striking process.

23. A method according to claim 1 further including intermingling material of the first section limb and the second section limb at the locations where the first section limb and the second section limb are joined.

* * * * *